United States Patent [19]

Meyer

[11] Patent Number: 5,642,677

[45] Date of Patent: Jul. 1, 1997

[54] WALK-BEHIND SELF-PROPELLED MULTI-FUNCTIONAL NURSERY DEVICE

[76] Inventor: Thomas A. Meyer, 1609 Hobe Rd., Woodstock, Ill. 60098

[21] Appl. No.: 579,101

[22] Filed: Dec. 27, 1995

[51] Int. Cl.⁶ .......................... A01B 33/02; A01C 23/00
[52] U.S. Cl. .......................... 111/118; 111/132; 172/114
[58] Field of Search .............................. 47/1.5, 1.7; 111/36, 111/37, 34, 52, 73, 173, 118, 133, 130; 172/98, 99, 38, 114, 233, 234, 292; 56/14.7

[56] References Cited

U.S. PATENT DOCUMENTS

| | | | |
|---|---|---|---|
| 3,822,655 | 7/1974 | Benedict et al. | 111/101 |
| 4,196,678 | 4/1980 | Lore et al. | 111/132 |
| 4,258,634 | 3/1981 | Lore et al. | 111/132 |
| 4,609,151 | 9/1986 | Crowley | 239/656 |
| 4,813,175 | 3/1989 | Meyer | 47/1.7 |
| 5,184,685 | 2/1993 | Meyer | 172/114 |

*Primary Examiner*—Terry Lee Melius
*Assistant Examiner*—Robert Pezzuto
*Attorney, Agent, or Firm*—Mathew R. P. Perrone, Jr.

[57] ABSTRACT

A walk-behind, multi-functional device for use in a nursery is capable cultivating while applying fertilizer and herbicide as desired. An electric clutch assembly combines with a steering assembly to permit easy maneuverability of the walk-behind device.

19 Claims, 9 Drawing Sheets

ns. Growing of the trees in a nursery is greatly assisted by the devices described in the prior patents.

WALK-BEHIND SELF-PROPELLED MULTI-FUNCTIONAL NURSERY DEVICE

This invention relates to a combination nursery device, and more particularly to a walk-behind, self-propelled, nursery device capable of cultivating; and applying fertilizer and pesticides, and other desired materials around trees.

BACKGROUND OF THE INVENTION

In U.S. Pat. Nos. 4,813,175 and 5,184,685 by the same inventor, incorporated herein by reference, the problems of applying fertilizer, pesticide or any combination thereof, while at the same time cultivating the ground, are discussed. An apparatus to solve these problems is especially useful in a nursery.

Growth of plants for commercial sale and planting around business structures or residential structures is still an extremely important business. The advantages of plants and trees both from an aesthetic and ecological standpoint are thoroughly discussed in the referenced patents. Growing of the trees in a nursery is greatly assisted by the devices described in the prior patents.

However, the devices described in the prior patents can be improved. Basically, the devices described in the prior patents are now known to be somewhat larger than a nursery can efficiently use. If the trees are planted even closer together in order to provide for more efficient use of the soil for growing the trees, more trees can be grown on less land. Yet, it must also be possible to service the trees efficiently, to provide for efficient growth.

It is difficult to develop a walk behind device that can be easily maneuvered, even considering the tight spaces of a nursery which grows trees. The steering assembly has to be adjusted properly and effective in tight places. The device has to be large enough to carry the required equipment. With the increased size of the device to carry the equipment, which provides the multiple functions, comes weight and difficulty of maneuvering the equipment for the operation.

Thus, use of a tractor, or other type of self-propelled ride upon modified a device is required for multiple functions and nursery treatments. What is desired is to provide for a smaller walk behind device which can be as easily, or more easily steered and handled in tighter corners, than a ride upon device.

While it is desired to apply fertilizer and other nutrients, along with a pesticide and a herbicide around a tree to assist in the growing thereof, it can be a problem if the spray contacts the bark. Such contact can destroy the advantage of the treatment. It is desired to avoid such bark spraying. Yet to avoid such spraying contact with the bark is difficult when using a tractor or similar device when spraying.

The size of the prior art device requires a larger area around the trees to permit maneuvers therebetween. But to plant more trees in the same land area requires hand treatment and cultivation. It is desirable to decrease the area required between the trees and provide the same protection as provided by the device described in the prior patents, while at the same time achieving the same results. If this can be accomplished, the same efficiency can be achieved as with the device of the prior art, while at the same time providing for more efficient use of land due to permitting the growing of more trees on that same land area.

As indicated in the prior patents, the appropriate device includes a place for the operator to ride. The sheer size of a device combining all of those features require the tractor type rider. If the tractor can be eliminated, while leaving the device still easily operable, the land can be used even more efficiently. The device can also be made much smaller.

It is difficult to even conceive of a device, which will cultivate or till, and apply fertilizer or herbicide, with one pass of the device. Without a tractor, it is difficult to provide for steering and maneuverability for a walk behind model. Yet it is clear that such a walk behind model can permit more efficient use of the land.

SUMMARY OF THE INVENTION

Among the many objectives of this invention is the provision of a walk behind device capable of cultivating around trees in a nursery while at the substantially the same time applying pesticide or fertilizer as desired.

Another objective of this invention is to provide a walk behind device, which is easily maneuverable.

Yet another objective of this invention is to provide a walk behind device, which is easily steerable.

Still another objective of this invention is to provide a walk behind device, which is easily stopped.

Also, an objective of this invention is to provide a walk behind device, which may selectively cultivate an area.

Additionally, an objective of this invention is to provide a walk behind device, which may selectively fertilize an area.

A further objective of this invention is to provide a mobile walk behind device.

A still further objective of this invention is to provide a walk behind device, which may selectively apply herbicide to an area.

Yet a further objective of this invention is to provide a walk behind device, which may selectively apply pesticide to an area.

Another objective of this invention is to provide a walk behind device, which may selectively apply insecticide to an area.

These and other objectives of the invention (which other objectives become clear by consideration of the specification, claims and drawings as a whole) are met by providing a walk-behind, multi-functional device for use in a nursery capable cultivating while applying fertilizer and herbicide as desired.

BRIEF DESCRIPTION OF DRAWINGS

Throughout the figures of the drawings where the same part appears in more than one figure, the same number is applied thereto.

DESCRIPTION OF THE PREFERRED EMBODIMENTS

The walk-behind device includes a frame. Below the frame are mounted a pair of steering or guide wheels in the front portion thereof and a pair of drive wheels on the rear portion thereof. Also below the frame is mounted a tilling assembly.

Mounted above the frame are the spray assembly, the brake assembly, the steering assembly, the tanks and the tank control mechanism. These devices are all interconnected so that the device may provide the necessary tilling and spray the necessary ingredients on or around a tree at the right position and the right time during the operation of the machine.

The steering, the clutches, the structure of the drive wheels and the guide wheels, and the electronic apparatus on this device cooperate to provide for a very efficient device. In particular, there are electric relays that render the operation of the nursery device very efficient.

The walk-behind device of this invention provides ease of operation for the worker in a nursery, especially a nursery for growing trees. The steering control both operates the clutch assembly and the steering assembly. The tiller assembly is easily raised and lowered, and thereby permits depth control and consistent tilling. The grader provides for the evenness of the tilling. The tiller control positions both ends of the tiller and permits the tilling to be accomplished in an even fashion.

The device is also self-propelled due to the clutch mechanism. In particular, for the ease in going around the tree in a counter-clockwise fashion, each of front or guide tires tow or turn at a different angle in order to simplify turning of the device. The outside guide tire is away from the tree and is connected to the inside guide tire. The inside guide tire is adjacent to the tree, when the device is in use.

When the device is turned, a gear and chain assembly connect the inside guide tire to the outside guide tire. The gear for the outside tire has more teeth and a larger diameter than the gear for the inside guide tire. This structure permits the inside guide tire to turn more sharply. This feature, in turn, permits the device to go around a tree more easily.

There is also a positraction clutch. With the actuation of the positraction clutch, the outer rear wheel turns at a rate up to about five times as fast as the inner rear wheel, thereby permitting the device to move more efficiently around the tree being treated by cultivation and application of fertilizer or pesticide. This feature cooperates with the turning of the guide wheels to provide for ease of maneuvering the device around a tree.

More preferably, with the actuation of the positraction clutch, the outer rear wheel turns or rotates at a rate of about two to about four times as fast as the inner rear wheel. Most preferably, with the actuation of the positraction clutch, the outer rear wheel turns at a rate of about three times as fast as the inner rear wheel. To reiterate, the positraction clutch permits the device to move more efficiently around the tree being treated and cooperates with the turning of the guide wheels to provide for ease of maneuvering the device around a tree.

Both an electrical and a manual brake are present on the device for safety, ease and efficiency in stopping. The herbicide nozzles and fertilizer nozzles are separated to avoid the problem of the interlocking sprays when required. Also, pesticides may be applied at the same time.

The spray button activates the fertilizer pump, the weed killer pump, and the positraction clutch. Within the pesticide, is included herbicide for weeds or insecticide for insects. Thus, fertilizer, weed killer and insecticide may be applied as desired to a tree.

The main switch, the fertilizer pump, the weed killer pump, the ground speed, the tiller clutch, the positraction clutch and the brake are all operated electrically. In this situation, there are five clutches. Two of the clutches provide for a gear reduction and permit the operation of the nursery device at one of two speeds. A positraction clutch permits the rotation of the nursery device around the tree being sprayed. The tiller clutch operates the tiller.

There is also a clutch brake which operates in reverse of the other clutches. In this fashion, the minute the steering lever is released, the clutch brake actuates and the device comes to an immediate halt. This provides time to apply a manual brake and keep the device locked in position.

Because this device is walk behind device, and can be stopped so efficiently, it much easier to leave the device briefly. This is especially true compared to climbing off of a riding device. So the ease of operating and stopping the device can result in time saved, when compared to a ride upon device.

Basically, the engine is connected through a series of gear reductions to the clutches and drive mechanism of the device. The rotation of the engine is reduced to a six to one basis, such that the normal revolutions per minutes (RPM) of the engine is around 3,000, which gear reduction takes down to 500 RPM. The clutch mechanisms permit further reduction to operate the device.

The engine is connected to a first shaft on a two to one gear ratio. The first shaft is connected to two driving clutches and a tiller clutch. The two driving clutches are connected to a second shaft. The first driving clutch is connected on an eight to fifteen ratio. The second driving clutch is connected on a one to three ratio to a third driving shaft.

The third driving shaft is connected to the clutch brake in the manual brake and to the rear wheel shaft on a one to two ratio. The rear wheel shaft is also connected to the positraction clutch on a three to two gear ratio and the fourth shaft is connected back to the rear wheel shaft at the wheel axle on a two to one ratio.

The front tires are connected by a chain. The chain ratio of the outside front tire to the inside front tire is five to four. Thus, the inside front tire can be turned substantially perpendicularly to the frame while the outside clutch tire remains a slight differential therefrom and permits a more efficient turning.

This particular tiller rig on the device is attached to a bar so that the tiller rig goes up and down in a straight line.

Because it goes up and down in a straight line, the cultivating is accomplished in an even more efficient fashion. The tiller is level with the ground instead of angled.

Electrically speaking, the nursery device includes a twelve volt battery which is wired to a main switch. The main switch is wired into a fuse block. Protruding from the fuse block are a series of six switches. The first switch operates the fertilizer pump. The second switch operates the weed killer pump. The third switch operates the ground speed indicator. The fourth switch operates the tiller clutch. The fifth switch operates the positraction clutch. The sixth switch operates the brake clutch. The brake clutch is connected to a brake control relay and to the steering button switch.

Also, there is a spray button switch connected into the handle which operates the fertilizer pump, the weed killer pump and the positraction clutch. This group operation permits the nursery device to rotate or otherwise move easily around a tree. The fertilizer pump switch and the weed killer switch can be turned off or on jointly or severally. This electric switch assembly for each of these functions provide that the spray button switch will operate the fertilizer pump and the pesticide pump, jointly in case it is desired to provide both types of spray, or severally in case it is desired to provide only one type of spray.

The electric switch assembly can also provide that spray button operate neither the fertilizer pump nor the pesticide pump. In that case, only the positraction clutch is operated.

The two speed relay control provides either a high speed clutch or a low speed clutch, which adjusts the speed of the device. The first clutch is preferably a thirty-two to sixty ratio, which slows the device. The second clutch is the thirty-two to thirty-two ratio which permits the reasonable speed. The wheels are steered by interlocking tooth and chain mechanisms which provide for efficient turning and efficient running of the device.

Figure 1:
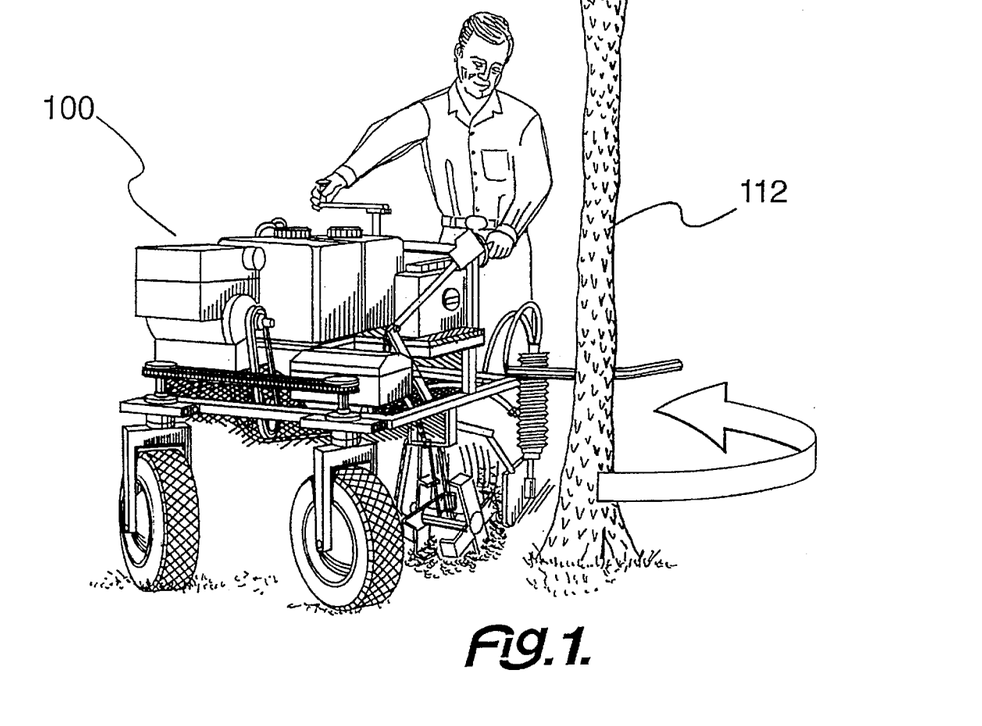
FIG. 1 depicts a frontal perspective view of the walk behind device 100 in use.
Figure 2:
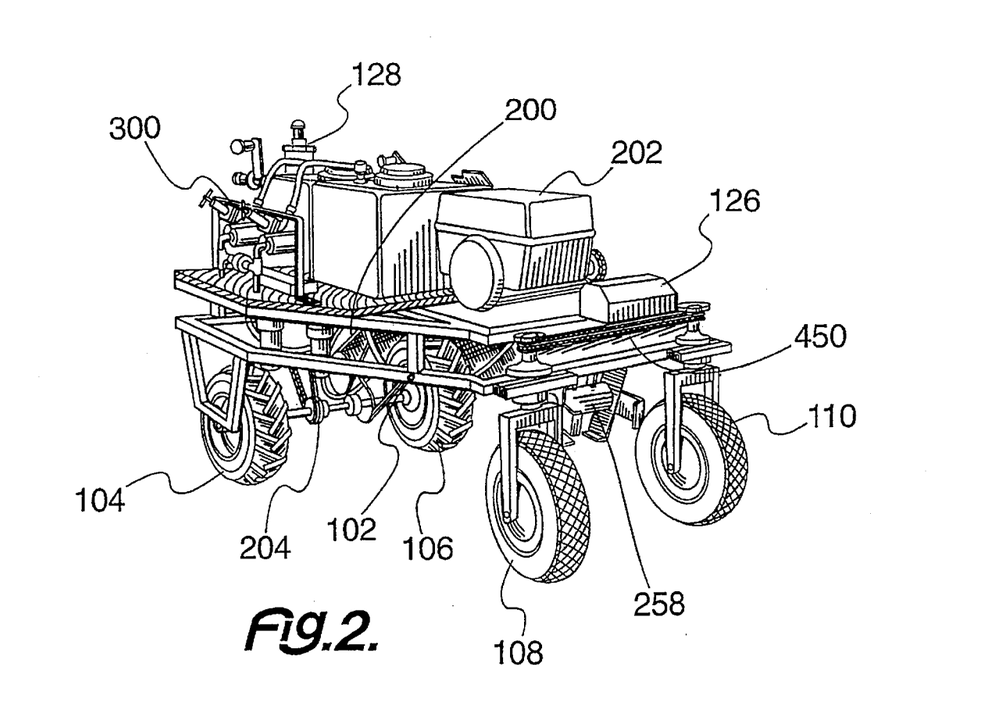
FIG. 2 depicts a front perspective view of the walk behind device 100.

Referring now to FIG. 1 and FIG. 2, the walk-behind, self-propelled, multi-functional nursery device 100 includes a frame 102. Mounted below the frame 102 are an outside drive wheel 104, an inside drive wheel 106, an outside guide wheel 108 and an inside guide wheel 110. Mounted above the frame 102 is the clutch assembly 200, the engine 202, the electrical circuit 120, the spray assembly 300 and the steering assembly 450.

Figure 3:
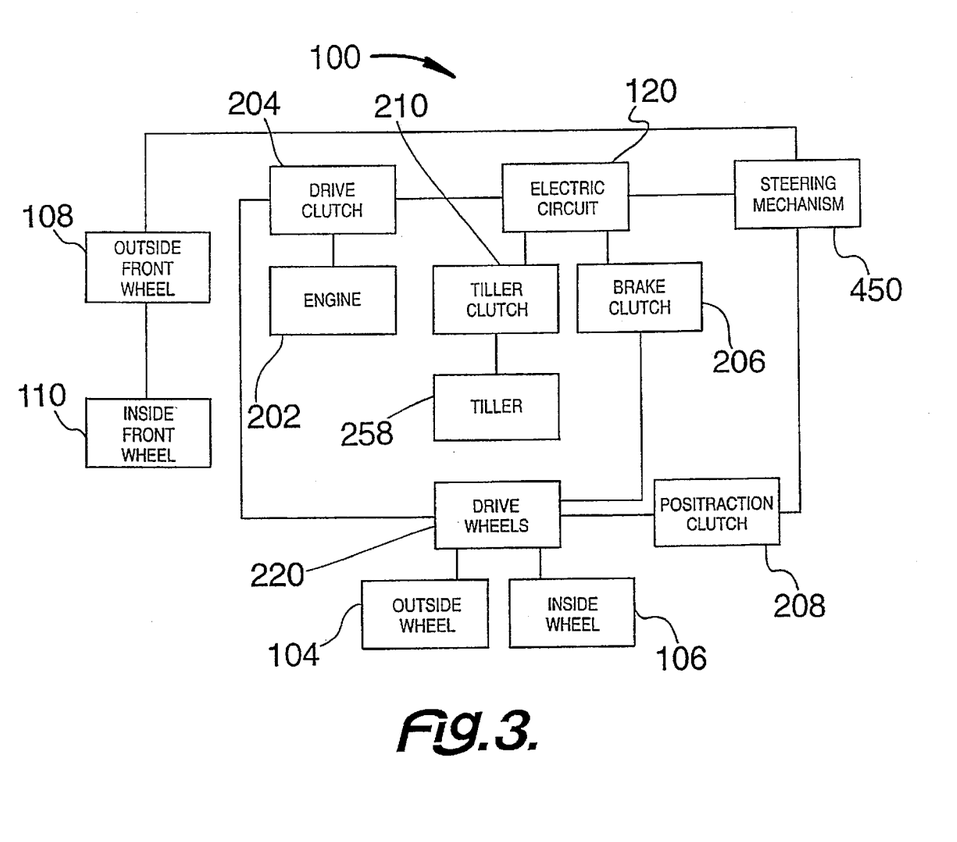
FIG. 3 depicts a partial block diagram of walk behind device 100.

Adding FIG. 3 to the consideration, the block diagram depicts how the clutch assembly 200 cooperates with the engine 202 and the electrical circuit 120 for efficient operation. The members of clutch assembly 200 include a drive clutch 204, a brake clutch 206, a positraction clutch 208, and a tiller clutch 210. All members of clutch assembly 200 are electrically operated through electrical circuit 120.

In particular, engine 202 is standardly connected to drive clutch 204 to provide for moving the device 100. More particularly, drive wheels 220 are connected to drive clutch 204 through electrical circuit 120. Also, connected to the drive wheels 220 is brake clutch 206. A simple move of the steering assembly 450 operates drive wheels 220 through drive clutch 204 or brake clutch 206 as desired.

With positraction clutch 208 electrically operated, outside drive wheel 104 of drive wheels 220, can rotate up to four times faster than inside drive wheel 106. This different rotation caused by the positraction permits the device 100 to turn easily around the tree 112 of FIG. 1. Outside drive wheel 104 and inside drive wheel 106 are mounted on rear drive shaft 226. Between the drive wheels 220 on rear drive shaft 226 is standardly mounted the positraction clutch 208.

Figure 4:
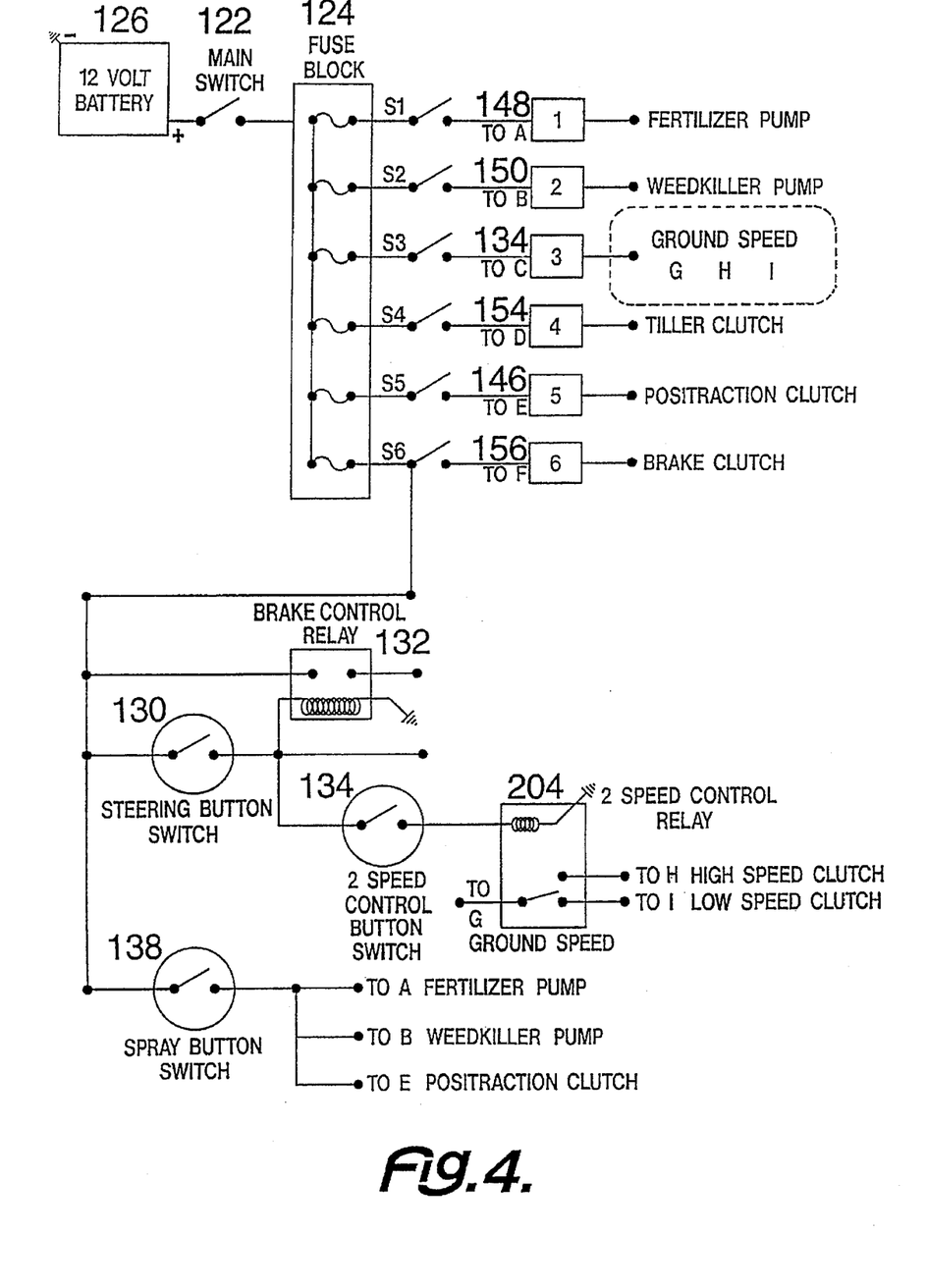
FIG. 4 depicts a schematic of an electrical circuit 120 used with walk behind device 100.
Figure 5:
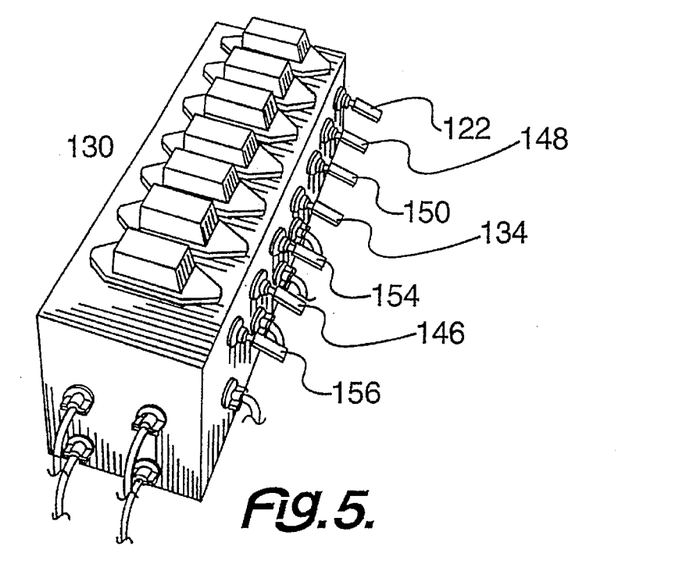
FIG. 5 depicts a perspective view of switch assembly 130 for use with electrical circuit 120.

Adding FIG. 4 and FIG. 5 to the consideration, the electrical circuit 120 of the cultivating device 100 depicts switch assembly 130. Switch assembly 130 includes a main switch 122 standardly connected to a fuse block 124 to a power source such as twelve volt battery 126. Off of the fuse box 124 is run a steering button switch 128. The steering button switch 128 controls the brake control relay 132 and the speed control switch 134 in a standard wiring procedure as depicted in FIG. 4.

The spray button switch 138 operates the fertilizer pump 140, the pesticide pump 142, and the positraction clutch 144. With the positraction clutch 144 in operation, the turning of the device 100 is made more efficient. Interposed between the spray button switch 138 and the pumps are positraction clutch switch 156, fertilizer pump switch 148 and pesticide or weed killer pump switch 150, which can determine how those items are operated.

Figure 6:
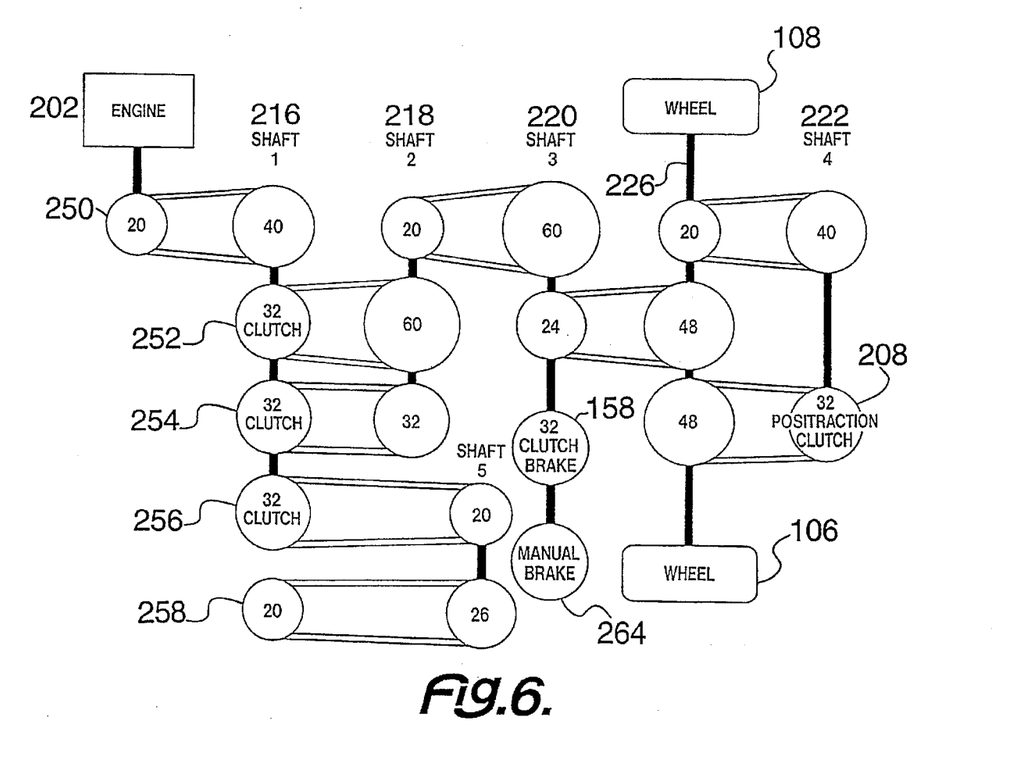
FIG. 6 depicts the diagram of clutch assembly 200 for use on the walk behind device 100.

To further explain the electrical circuit 120, interposed between the steering button switch 130 and brake clutch 158 is the brake control relay 132. This electric operation of the brake clutch 158 permits quick stopping of device 100 when necessary. The steering button switch 130 is also connected to the ground speed control button switch 134. The ground speed control button switch 134 is further connected to two speed relay control 164 and the drive clutch 204. The drive clutch 204 includes low speed clutch 252 and the high speed clutch 254 (FIG. 6).

As shown in FIG. 4, the battery 126 is connected through a main switch 122 to a fuse block 124. Fuse block 124 provides a switch assembly which includes the fertilizer pump switch 148, the weed killer pump switch 150, the ground speed control switch 134, the tiller clutch switch 154, the positraction switch 146, and the brake switch 168.

The fuse block 124 is mounted in a switch box 160. On the top of switch box 160 are indicator lights 162 for each switch. Thus, the indicator lights 160 can indicate which of the independent switches are in operation at the time the main switch 122 is closed for procedures.

With these switches interlocked in this fashion, the spray button switch 138 can cause the efficient turning of the device 100 while the steering button switch 130 can cause the device 100 to proceed or stop upon release. Such electrical control of operations permits efficient and safe operation of the device.

In FIG. 6, the clutch assembly 200 connects the engine 202 to the rear drive shaft 226 which has outside drive wheel 104 and inside drive wheel 106 mounted thereon as drive wheels 220. Between the drive wheels 220 is the positraction clutch 208 electrically connected to the positraction clutch switch 146.

The engine 202 is connected to the first clutch shaft 216. The first clutch shaft 216 is connected to the second clutch shaft 218. The third clutch shaft 228 is connected to the rear drive shaft 226. The rear drive shaft 226 is connected to the fourth shaft 222. Such connections are achieved in the standard fashion with electric clutches.

On the first shaft 216 connected directly to the engine 202 is a first gear reduction assembly 250 which is usually present in a 1 to 2 ratio. The first gear reduction assembly is connected to the low speed clutch 252 and the high speed clutch 254. The high speed clutch 254 has a one to one ratio; the low speed clutch 252 has a one to two ratio although other appropriate ratios are available.

Also off the first shaft 216 is the tiller clutch 256, which has a eight to five ration for driving the tiller 258. The tiller 258, of course, is independently operated by its clutch 256, and the mechanical raising and lowering of tiller assembly 400 described in FIG. 9. From the first shaft 216, the high speed clutch 254 and the low speed clutch 252 are connected.

The second shaft 218 is connected to the third shaft 228 through a one to three gear ratio and includes the clutch brake 260, which is electrically operated. The clutch brake 260 automatically activates upon release of the steering control 262 to brake and stop the device 100 completely. This provides time for one to apply the manual brake 264 and completely stop the device 100.

The third shaft 228 is connected to the rear wheel shaft 230 on a one to two gear ratio. By the same token, the rear wheel shaft 230 is connected to the fourth shaft 222 to provide the positraction clutch 208. This positraction clutch 208 causes the outside wheel 104 to turn at a preferable ratio of about three to one of the inside wheel 106. This ratio assists in the efficient turning of the device 100 around the tree 112.

Figure 7:
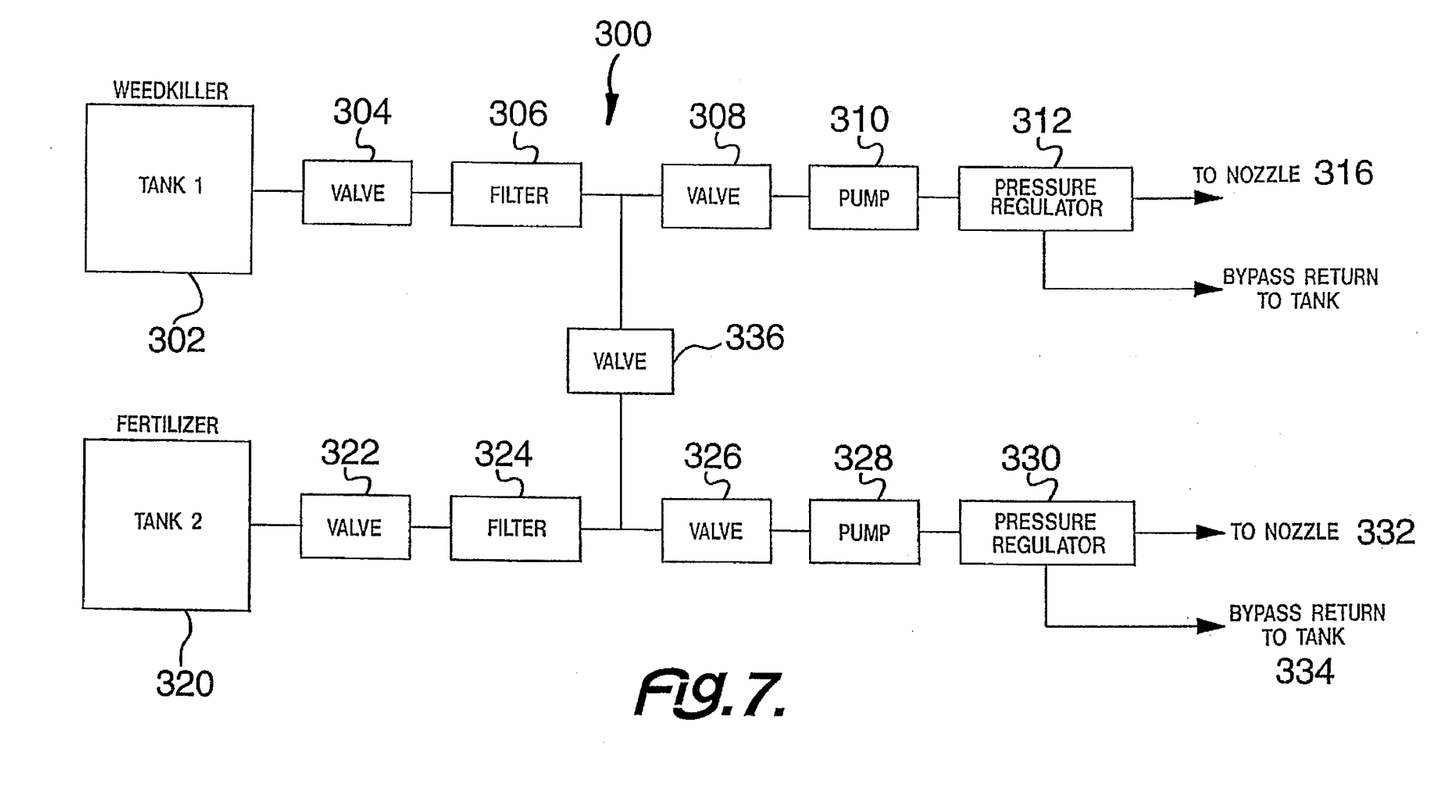
FIG. 7 depicts a block diagram of the spray assembly 300 for use on the walk behind device 100.
Figure 8:
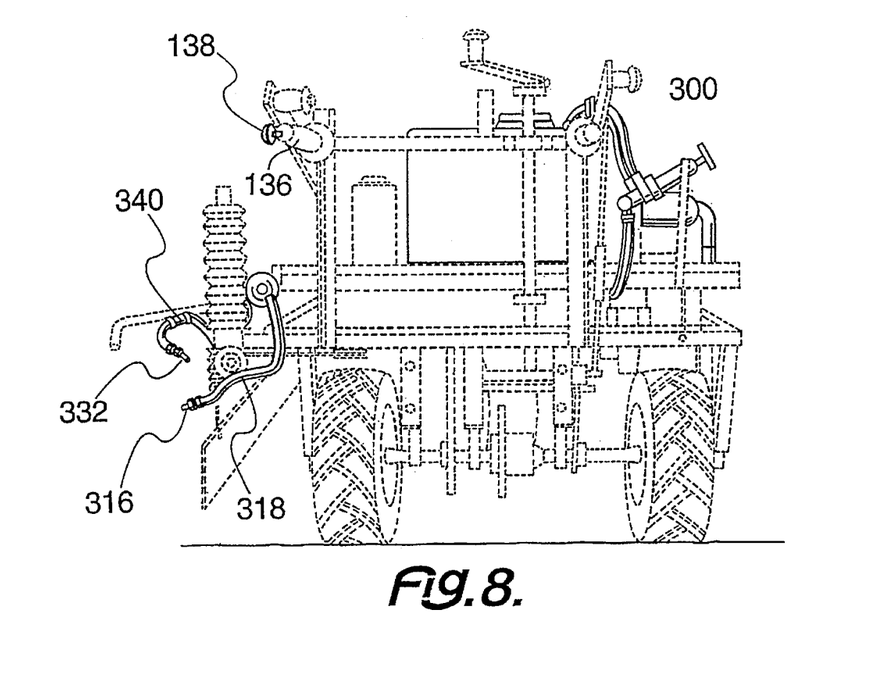
FIG. 8 is a partial depiction of the spray assembly 300 with the walk behind device 100 shown in phantom from a rear perspective.
Figure 14:
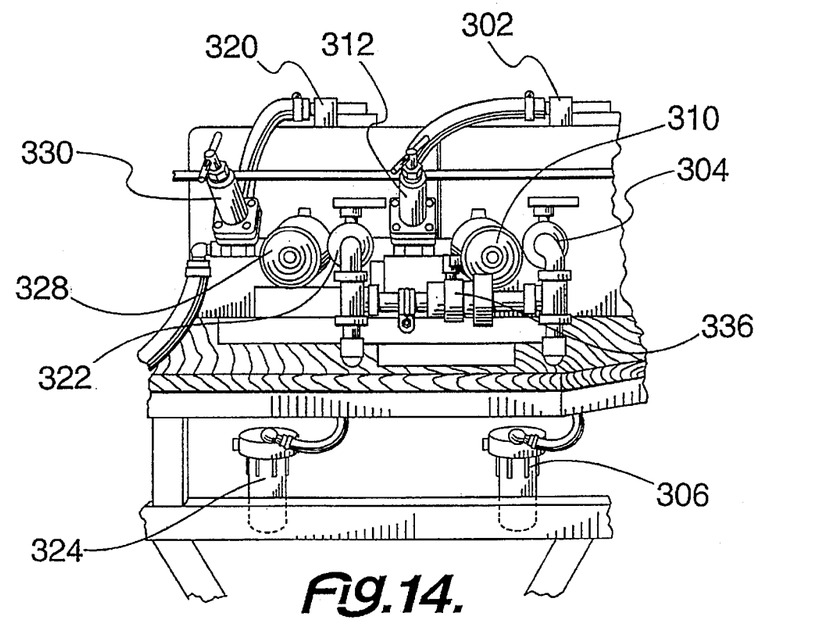
FIG. 14 depicts the spray assembly 300 for use on the walk behind device 100.

In FIG. 7, FIG. 8 and FIG. 14, the structure of spray assembly 300 is depicted. The spray assembly 300 is substantially similar to the tank or spray assemblies of the above referenced patents by the applicant herein. First tank 302 contains a pesticide such as a weedkiller or an insecticide. Preferably the pesticide is a weedkiller or an herbicide.

First tank 302 is sequentially connected to a first primary valve 304, first filter 306, first secondary valve 308, first pump 310, first pressure regulator 312. From first pressure regulator 312, the fluid in first tank 302 flows to first nozzle 316 by first hose 318 and to first bypass 318. First bypass 318 leads any excess fluid back to first tank 302. The connections therebetween are standard.

Likewise, second tank 320 has a structure similar to first tank 302. However, second tank 320 usually contains fertilizer. Second tank 320 is sequentially connected to a second primary valve 322, second filter 324, second support valve 326, second pump 328, second pressure regulator 330. From second pressure regulator 330, the fluid in second tank 320 flows to second nozzle 332 by second hose 340 and to second bypass 334 with leads back to second tank 320. The connections therebetween are standard. First tank 302 and second tank 320 are connected to first nozzle 316 and second nozzle 332 respectively in similar fashions.

Bridging valve 336 connects first tank 302 to second tank 320. More particularly, bridging valve 336 is connected at one end between first filter 306 and first secondary valve 308, and at the other end between second filter 324 and second support valve 326. Bridging valve 336 permits mixing of material to be sprayed if desired.

For FIG. 8, on left hand grip 136 is spray switch 138. Spray switch 138 is electrically connected to the positraction clutch 156 in order to provide for ease of moving device 100 around tree 112. Spray switch 138 also activates fertilizer pump 140 and weed killer pump 142.

Figure 9:
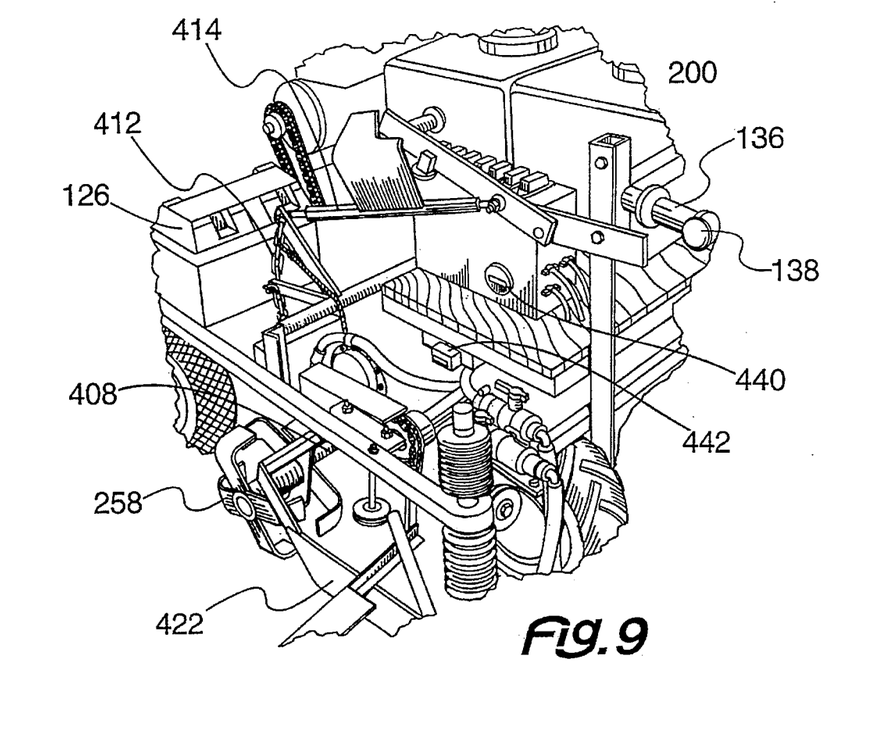
FIG. 9 is a partial depiction of the tiller assembly 400 for use on the walk behind device 100.
Figure 10:
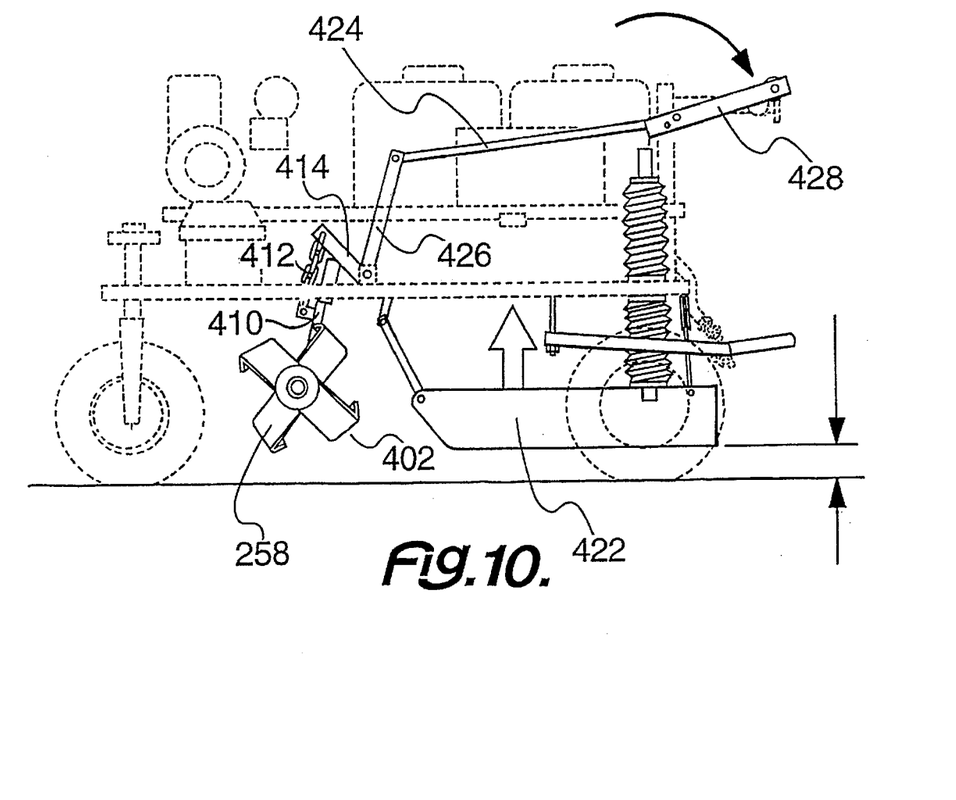
FIG. 10 is a partial depiction of the tiller assembly 400 in the up position 402 with the walk behind device 100 shown in phantom.
Figure 11:
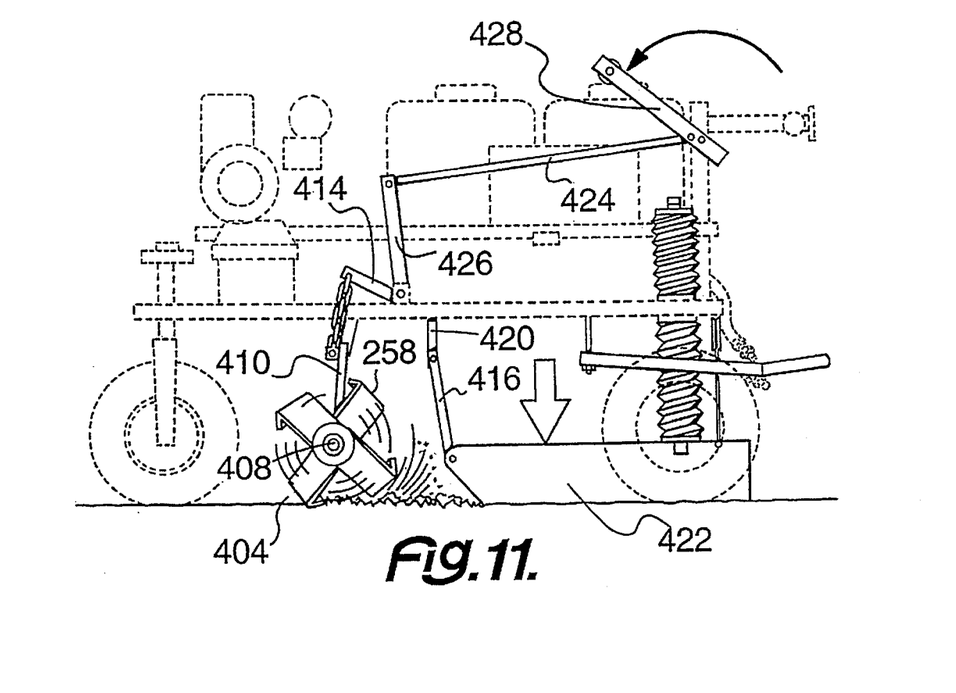
FIG. 11 is a depiction of the tiller assembly 400 in the down position 404 with the walk behind device 100 shown in phantom.
Figure 12:
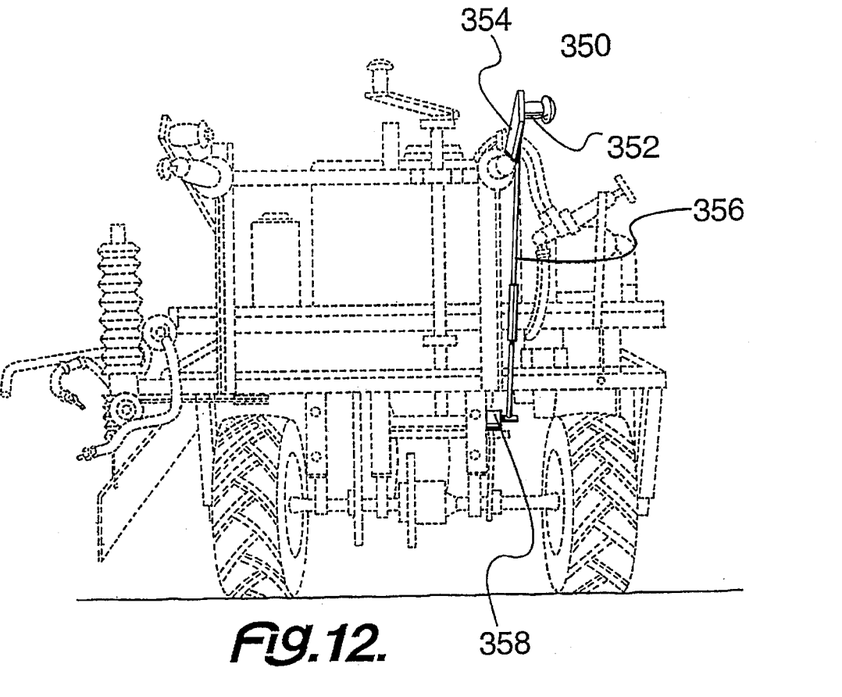
FIG. 12 is a partial depiction of the brake assembly 350 with the walk behind device 100 shown in phantom.

Referring now to FIG. 9, FIG. 10 and FIG. 11, the operation of tiller assembly 400. Tiller assembly 400 includes tiller clutch 256 (FIG. 6) is shown as operating the tiller tines 406. The tiller tines 406 can be in an up position 402 for moving from one position to another, or in a down position 404, when the tiller tines 406 are cultivating a desired area. The tiller assembly 400 includes tines 406, which are mounted on a tiller axle 408. The tiller axle 408 is connected to a bar 410, which is attached to a chain 412.

The chain 412 is attached to a lifting lever 414 at the other end oppositely disposed from bar 410. Bar 410 is movably and centrally secured to tiller axle 408. This structure provides for even contact of the ground with tiller tines 406. More particularly, tiller axle 408 includes a set of tines 406 at each end thereof. With bar 410 centrally secured each set of tines remains substantially parallel to the ground 114, whether in up position 402 or down position 404.

Lifting lever 414 is bolted to the blade mount 416 with blade arm 418 and a joining arm 420. Joining arm 420 is hingedly and movably secured to blade 422. Blade 422 permits the area cultivated by tines 406 to be leveled. The tiller clutch 210 operates off tiller chain 398 as connected in a standard fashion to tiller tines 406.

This leverage permits the tines 406 and the blade 422 to be dropped to down position 404 or raised to up position 402 as desired and at the same time through activating arm 424. Activating arm 424 is connected at one end blade mount 416 and at the other end intermediate arm 426. Blade mount 416 is secured to frame 102 and provides for partial rotation of arms secured thereto. Intermediate arm 426 extends into operating arm 428, which serves the raising and lowering function for tiller assembly 400.

Blade 422 is connected at the other to shock absorbing arm 430. Shock absorbing arm 430 and joining arm 420 cooperate to support blade 422. Shock absorbing 430 is connected at one end to frame 102 and at the other end to blade 422.

For maintenance purposes, an hour meter 440 and tree counter 442 are wired to frame 102 in a standard fashion. Hour meter 440 serves to determine how many hours device 100 has been operated, and when preventive maintenance should be undertaken. Tree counter 442 counts the activations of tiller assembly 400 and the lifting lever 414 thereof, and thereby provides a basis to estimate how many trees have been treated.

Figure 13:
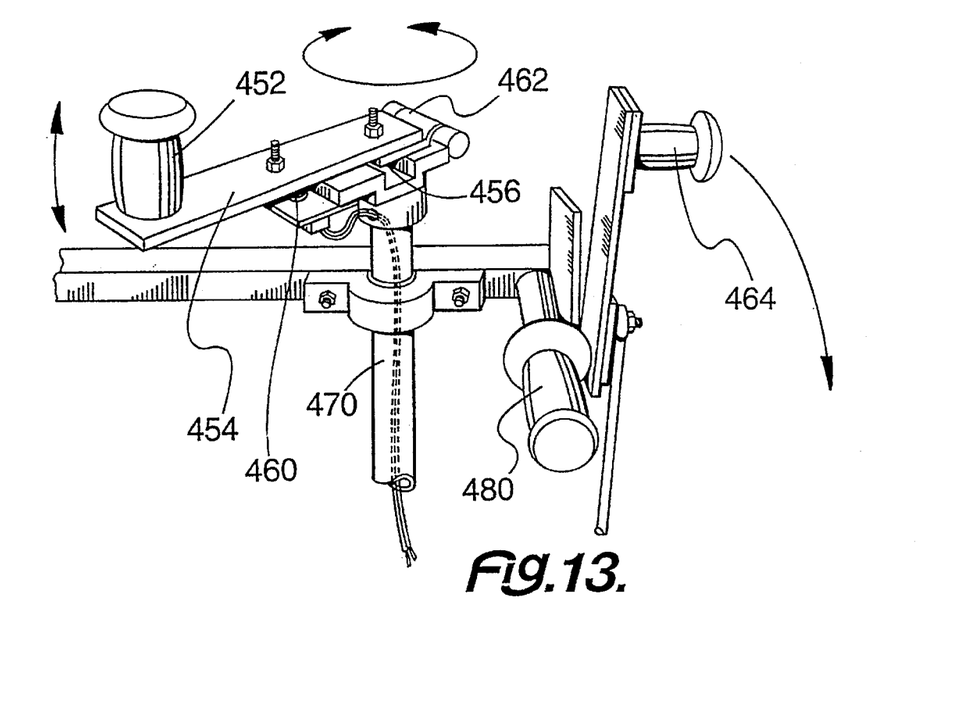
FIG. 13 depicts the steering assembly 450 for use on the walk behind device 100.

In FIG. 13, the hand brake assembly 350 includes a grip lever 352. The grip lever 352 is connected to the brake operating lever 354, which is in turn connected to the brake applying lever 356. Brake applying lever 356 operates the brake grip 358 to stop or release device 100 as desired.

Also in FIG. 13, the steering assembly 450 is secured to the frame 102. Steering assembly 450 includes a steering grip 452 attached to a steering bar 454. Steering bar 454 is mounted on a steering spring 456. While steering spring 456 is mounted at one end to steering bar 454, it is mounted at the other end to steering base 458.

Steering switch 460 is contained in steering base 458. Steering bar 454 is also mounted on steering hinge 462. Steering hinge 462 and steering spring cooperate to activate steering switch 460 with a downward motion of steering bar 454 and deactivate by spring 456 influenced upward motion.

Steering switch 460 is electrically connected to main switch 148 (FIG. 4) in a standard fashion. Thus steering assembly 450 can operate brake clutch 158 in the up position and provide time for hand brake 464 to be applied. In the down position steering assembly 450 can operate drive clutch 204 as desired.

Steering base 458 is mounted on a top end 472 of steering post 470. Steering base 458 is hollow to provide for passage of wires 474 for the required electrical connections for device 100. Steering switch 460 is thus appropriately connected to the operating functions of device 100

FIG. 13 also depicts a right hand grip 480. The right hand of an operator may rest on right hand grip 480, when it is not desired to handle the steering grip 452 is operated by the right hand.

Figure 15:
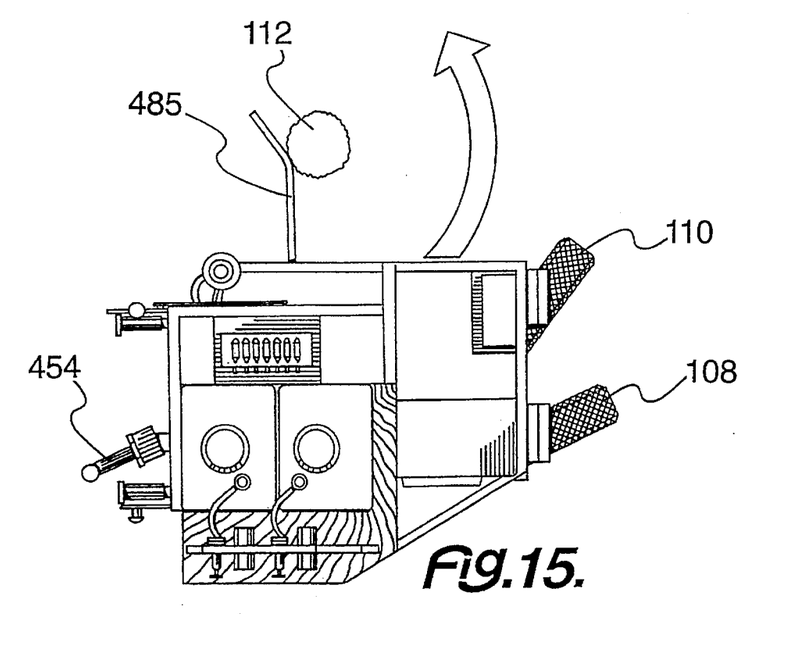
FIG. 15 depicts the steering assembly 450 in a hard left turn mode 452.

As shown in FIG. 15, positraction clutch 156 cooperates with outside guide wheel 108 and inside guide wheel 110.

Preferably outside guide wheel 108 is connected to steering post 470 through a one to one chain and gear assembly 472. Inside guide wheel 110 is connected outside guide wheel 108 on a five to four chain gear assembly 474.

This gear ratio causes a tow relationship between outside guide wheel 108 and inside guide wheel 110. When steering arm 458 is rotated for a turn, inside guide wheel 110 is turned more sharply than outside guide wheel 108. This factor combined with positraction clutch 156 permits efficient turning for device 100.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this method and apparatus can become clear to a person having ordinary skill in this particular art. Such modifications are clearly covered by this disclosure.

What is claimed and sought to be protected by Letters Patent of the United States is:

1. A combination nursery device being a walk-behind, self-propelled, nursery device capable of cultivating; and applying fertilizer and pesticides, comprising:
   (a) a frame supporting the nursery device;
   (b) the nursery device including a guide means and a driving means to support the frame;
   (c) an engine being supported on the frame;
   (d) the guide means being controlled by a steering means;
   (e) the engine being connected to the driving means through an electric clutch assembly;
   (f) an electric switch assembly being connected to the electric clutch assembly for selective operation thereof;
   (g) the electric clutch assembly including a reverse clutch and at least one forward clutch;
   (h) a tilling assembly being mounted below the frame;
   (i) the driving means including a pair of driving wheels mounted on a rearward portion of the frame;
   (j) the guide means including a pair of guiding wheels oppositely disposed from the pair of driving wheels and mounted on a forward portion of the frame;
   (k) the pair of guiding wheels being controlled by the steering means; and
   (l) the tilling assembly being connected to a positioning device for raising or lowering the tilling assembly.

2. The combination nursery device of claim 1 further comprising:
   (a) a spray assembly being mounted on and above the frame;
   (b) a brake assembly being mounted on and above the frame; and
   (c) the steering means being mounted on and above the frame.

3. The combination nursery device of claim 2 further comprising:
   (a) the spray assembly including at least one tank and a tank control mechanism; and
   (b) the spray assembly being simultaneously operable with the tilling assembly.

4. The combination nursery device of claim 1 further comprising:
   (a) a steering control for operating both the clutch assembly and the steering means;
   (b) the clutch assembly including a positraction clutch to assist the turning of the nursery device; and
   (c) the steering means including a wheel positioning device to cooperate with the positraction clutch to assist the turning of the nursery device.

5. The combination nursery device of claim 4 further comprising:
   (a) the positraction clutch to assist the turning of the nursery device being connected to the steering control;
   (b) a spray assembly being mounted on and above the frame;
   (c) the spray assembly including a spray operating switch; and
   (d) the spray operating switch operating the spray assembly and the positraction clutch.

6. The combination nursery device of claim 5 further comprising:
   (a) the pair of driving wheels including an inside driving wheel and an outside driving wheel oppositely disposed from the inside driving wheel;
   (b) the inside driving wheel being adapted for placement adjacent to a tree when the nursery device is used; and
   (c) the positraction clutch causing the outside wheel to rotate faster than the inside driving wheel to assist the turning of the nursery device.

7. The combination nursery device of claim 6 further comprising:
   (a) the pair of guiding wheels including an inside guiding wheel and an outside guiding wheel oppositely disposed from the inside guiding wheel;
   (b) the inside guiding wheel being adapted for placement adjacent to a tree when the nursery device is used; and
   (c) the outside guiding wheel being connected to the steering means.

8. The combination nursery device of claim 7 further comprising:
   (a) the inside guiding wheel and the outside guiding wheel being connected by a gear and chain assembly;
   (b) an outside gear of the gear and chain assembly being on the outside guiding wheel;
   (c) an inside gear of the gear and chain assembly being on the inside guiding wheel; and
   (d) the outside gear having a larger diameter than the inside gear, to thereby permit to inside guiding wheel to turn more sharply than the outside guiding wheel.

9. The combination nursery device of claim 8 further comprising:
   (a) the positraction clutch permitting the outside driving wheel to rotate up to about five times as fast as the inner rear wheel; and
   (b) the clutch assembly further including a reverse clutch and at least one forward clutch.

10. The combination nursery device of claim 9 further comprising:
    (a) the reverse clutch being disposed to the drive the nursery device in a direction opposite to a direction required by the at least one forward clutch;
    (b) the reverse clutch being actuated through the steering means; and
    (c) the nursery device further including a manual brake.

11. The combination nursery device of claim 10 further comprising:

(a) the reverse clutch serving as an electric brake;

(b) the manual brake being applicable as the nursery device is halted;

(c) the clutch assembly including five clutches;

(d) the five clutches including a first gear reduction clutch, a second gear reduction clutch, the positraction clutch, and a tiller clutch;

(e) the first gear reduction clutch and the second gear reduction clutch being connected to the engine of the nursery device;

(f) the first gear reduction clutch and the second gear reduction clutch serving to adjust the speed of the nursery device; and (g) the tiller clutch operating a tiller assembly for cultivating around the tree.

12. The combination nursery device of claim 11 further comprising:

(a) the tiller assembly being connected to a bar mount;

(b) the bar mount being centrally mounted on the tiller assembly in order to provide for even raising and lowering of the tiller with even cultivation; and (c) an electric switch assembly operating the nursery device.

13. The combination nursery device of claim 12 further comprising:

(a) the electric switch assembly including a main switch and a fuse block;

(b) the main switch being wired into the fuse block;

(c) the fuse block including a first switch; a second switch, a third switch, a fourth switch, a fifth switch and a sixth switch;

(d) the first switch operating a fertilizer pump;

(e) the second switch operating a pesticide killer pump;

(f) the third switch operating a ground speed indicator;

(g) the fourth switch operating the tiller clutch;

(h) the fifth switch operating the positraction clutch; and (i) the sixth switch operates the reverse clutch.

14. The combination nursery device of claim 13 further comprising:

(a) the steering means including a brake connection to the reverse clutch to operate the brake clutch on release of the steering means;

(b) the spray assembly including a spray button switch;

(c) the spray button switch operating the fertilizer pump, the pesticide pump and the positraction clutch thereby permitting the nursery device to move easily around a tree; and (d) the first switch, the second switch, the fifth switch, and the spray button switch serving to operate at least one item selected from the group consisting of the fertilizer pump; the pesticide pump; and positraction clutch.

15. The combination nursery device of claim 14 further comprising:

(a) the switch assembly including a series of indicator lights;

(b) the series of indicator lights including a main light to indicate operation of the main switch, a first light to indicate operation of the first switch, a second light to indicate operation of the second switch, a third light to indicate operation of the third switch, a fourth light to indicate operation of the fourth switch, a fifth light to indicate operation of the fifth switch, and a sixth light to indicate operation of the sixth switch.

16. The combination nursery device of claim 15 further comprising:

(a) the steering means being secured to the frame;

(b) the steering means including a steering grip attached to a steering bar;

(c) the steering bar being mounted on a steering spring, the steering spring being oppositely disposed from the steering grip;

(d) the steering spring being mounted at one end to the steering bar and at the other end to a steering base;

(e) a steering switch being contained in the steering base;

(f) the steering bar being mounted on a steering hinge;

(g) the steering hinge and the steering spring cooperating to activate the steering switch with a downward motion of the steering bar and deactivate the steering switch by an upward motion; and (h) the steering switch being electrically connected to the main switch to thereby provide for operation of the brake clutch in the up position and provide time for the manual brake to be applied.

17. A combination nursery device being a walk-behind, self-propelled, nursery device capable of cultivating; and applying fertilizer and pesticides, comprising:

(a) a frame supporting the nursery device;

(b) the nursery device including a guide means and a driving means to support the frame;

(c) an engine being supported on the frame;

(d) the guide means being controlled by a steering means;

(e) the engine being connected to the driving means through an electric clutch assembly;

(f) an electric switch assembly being connected to the electric clutch assembly for selective operation thereof;

(g) the electric clutch assembly including a reverse clutch and at least one forward clutch;

(h) a tilling assembly being mounted below the frame;

(i) the driving means including a pair of driving wheels mounted on a rearward portion of the frame;

(j) the guide means including a pair of guiding wheels oppositely disposed from the pair of driving wheels and mounted on a forward portion of the frame;

(k) the pair of guiding wheels being controlled by the steering means;

(l) the tilling assembly being connected to a positioning device for raising or lowering the tilling assembly;

(m) a spray assembly being mounted on and above the frame;

(n) a brake assembly being mounted on and above the frame;

(o) the steering means being mounted on and above the frame;

(p) the spray assembly including at least one tank and a tank control mechanism;

(q) the spray assembly being simultaneously operable with the tilling assembly;

(r) a steering control for operating both the clutch assembly and the steering means; and (s) the clutch assembly including a positraction clutch to assist the turning of the nursery device.

18. The combination nursery device of claim 17 further comprising:

(a) the steering means including a wheel positioning device to cooperate with the positraction clutch to assist the turning of the nursery device;

(b) a spray assembly being mounted on and above the frame;

(c) the spray assembly including a spray operating switch;

(d) the spray operating switch operating the spray assembly and the positraction clutch;

(e) the pair of driving wheels including an inside driving wheel and an outside driving wheel oppositely disposed from the inside driving wheel;

(f) the inside driving wheel being adapted for placement adjacent to a tree when the nursery device is used;

(g) the positraction clutch causing the outside wheel to rotate faster than the inside driving wheel to assist the turning of the nursery device;

(h) the pair of guiding wheels including an inside guiding wheel and an outside guiding wheel oppositely disposed from the inside guiding wheel;

(i) the inside guiding wheel being adapted for placement adjacent to a tree when the nursery device is used;

(j) the outside guiding wheel being connected to the steering means;

(k) the inside guiding wheel and the outside guiding wheel being connected by a gear and chain assembly;

(l) an outside gear of the gear and chain assembly being on the outside guiding wheel;

(m) an inside gear of the gear and chain assembly being on the inside guiding wheel;

(n) the outside gear having a larger diameter than the inside gear, to thereby permit to inside guiding wheel to turn more sharply than the outside guiding wheel;

(o) the positraction clutch permitting the outside driving wheel to rotate about two to about four times as fast as the inner rear wheel;

(p) the clutch assembly further including a reverse clutch and at least one forward clutch;

(q) the reverse clutch being disposed to the drive the nursery device in a direction opposite to a direction required by the at least one forward clutch;

(r) the reverse clutch being actuated through the steering means;

(s) the nursery device further including a manual brake;

(t) the reverse clutch serving as an electric brake;

(u) the manual brake being applicable as the nursery device is halted;

(v) the clutch assembly including five clutches;

(w) the five clutches including a first gear reduction clutch, a second gear reduction clutch, the positraction clutch, and a tiller clutch; and (x) the first gear reduction clutch and the second gear reduction clutch being connected to the engine of the nursery device.

19. The combination nursery device of claim 18 further comprising:

(a) the first gear reduction clutch and the second gear reduction clutch serving to adjust the speed of the nursery device;

(b) the tiller clutch operating a tiller assembly for cultivating around the tree;

(c) the tiller assembly being connected to a bar mount;

(d) the bar mount being centrally mounted on the tiller assembly in order to provide for even raising and lowering of the tiller with even cultivation;

(e) an electric switch assembly operating the nursery device;

(f) the electric switch assembly including a main switch and a fuse block;

(g) the main switch being wired into the fuse block;

(h) the fuse block including a first switch; a second switch, a third switch, a fourth switch, a fifth switch and a sixth switch;

(i) the first switch operating a fertilizer pump;

(j) the second switch operating a pesticide killer pump;

(k) the third switch operating a ground speed indicator;

(l) the fourth switch operating the tiller clutch;

(m) the fifth switch operating the positraction clutch;

(n) the sixth switch operating the reverse clutch;

(o) the steering means including a brake connection to the reverse clutch to operate the brake clutch on release of the steering means;

(p) the spray assembly including a spray button switch;

(q) the spray button switch operating the fertilizer pump, the pesticide pump and the positraction clutch thereby permitting the nursery device to move easily around a tree;

(r) the first switch, the second switch, the fifth switch, and the spray button switch serving to operate at least one item selected from the group consisting of the fertilizer pump; the pesticide pump; and positraction clutch;

(s) the switch assembly including a series of indicator lights; and (t) the series of indicator lights including a main light to indicate operation of the main switch, a first light to indicate operation of the first switch, a second light to indicate operation of the second switch, a third light to indicate operation of the third switch, a fourth light to indicate operation of the fourth switch, a fifth light to indicate operation of the fifth switch, and a sixth light to indicate operation of the sixth switch.

* * * * *